US009647429B2

(12) United States Patent
Niles et al.

(10) Patent No.: US 9,647,429 B2
(45) Date of Patent: May 9, 2017

(54) METHOD OF USING BARRIER WALLS IN ELECTRICAL POWER TRANSMISSION SYSTEMS

(71) Applicant: Cantega Technologies Inc., Edmonton (CA)

(72) Inventors: Martin S. Niles, Stony Plain (CA); Edmond LeRouzic, Edmonton (CA); Anton Babushkin, Edmonton (CA); Scott Young, Edmonton (CA)

(73) Assignee: Cantega Technologies Inc., Edmonton (CA)

( * ) Notice: Subject to any disclaimer, the term of this patent is extended or adjusted under 35 U.S.C. 154(b) by 103 days.

(21) Appl. No.: 14/448,904

(22) Filed: Jul. 31, 2014

(65) Prior Publication Data
US 2016/0035464 A1    Feb. 4, 2016

(51) Int. Cl.
| | | |
|---|---|---|
| *H01H 11/00* | (2006.01) | |
| *H01H 65/00* | (2006.01) | |
| *H02B 1/14* | (2006.01) | |

(52) U.S. Cl.
CPC .......... *H02B 1/14* (2013.01); *Y10T 29/49105* (2015.01)

(58) Field of Classification Search
CPC   H01H 33/12; H01H 33/6661; Y10T 477/671; Y10T 29/49105; H01B 3/30; H02B 1/14
USPC ...................... 29/622, 428, 559; 52/101, 121
See application file for complete search history.

(56) References Cited

U.S. PATENT DOCUMENTS

| | | | |
|---|---|---|---|
| 5,058,335 | A | 10/1991 | Richter |
| 5,293,721 | A | 3/1994 | Richard et al. |
| 5,650,594 | A | 7/1997 | Urnovitz |
| 5,918,404 | A | 7/1999 | Ohba |
| 6,546,676 | B2 | 4/2003 | Wiesener et al. |
| 6,571,517 | B2 | 6/2003 | Wulff et al. |
| 6,730,852 | B1 | 5/2004 | Puigcerver et al. |
| 7,154,034 | B2 | 12/2006 | Lynch |
| 7,839,256 | B2 | 11/2010 | Bradford et al. |
| 8,359,791 | B1 | 1/2013 | Nixon et al. |
| 8,627,613 | B2 * | 1/2014 | Parker ...................... H02G 7/00 52/101 |

OTHER PUBLICATIONS

"Single-phase overhead distribution switches", ABB Inc., Pinetops NC, 2010.
"Overhead Switches—Gang-Operated Types AR, D7 & D6—Catalog 14A", Hubbell Power Systems, Leeds, Alabama, Jan. 2013.
"About Critter Guard, Inc." [online], retrieved Jun. 3, 2013 from http://www.critterguard.org.
"E/Cutout Cover" [online], retrieved May 2, 2013 from http://www.midsungroup.com/E/Products/cutoutcovers.html.
"Bus Insulator Squirrel Guard", Raychem BISG, Apr. 2012.

* cited by examiner

*Primary Examiner* — Thiem Phan
(74) *Attorney, Agent, or Firm* — Anthony R. Lambert

(57) ABSTRACT

A method of protecting an exposed switch mounted on a structural frame in an electrical power transmission system, the switch having one or more insulators extended from the structural frame, first and second conductor connectors supported on the one or more insulators, and a blade connected to pivot to close and open an electrical path between the first and second conductor connectors, the method including mounting a barrier wall adjacent the switch and on the structural frame.

8 Claims, 7 Drawing Sheets

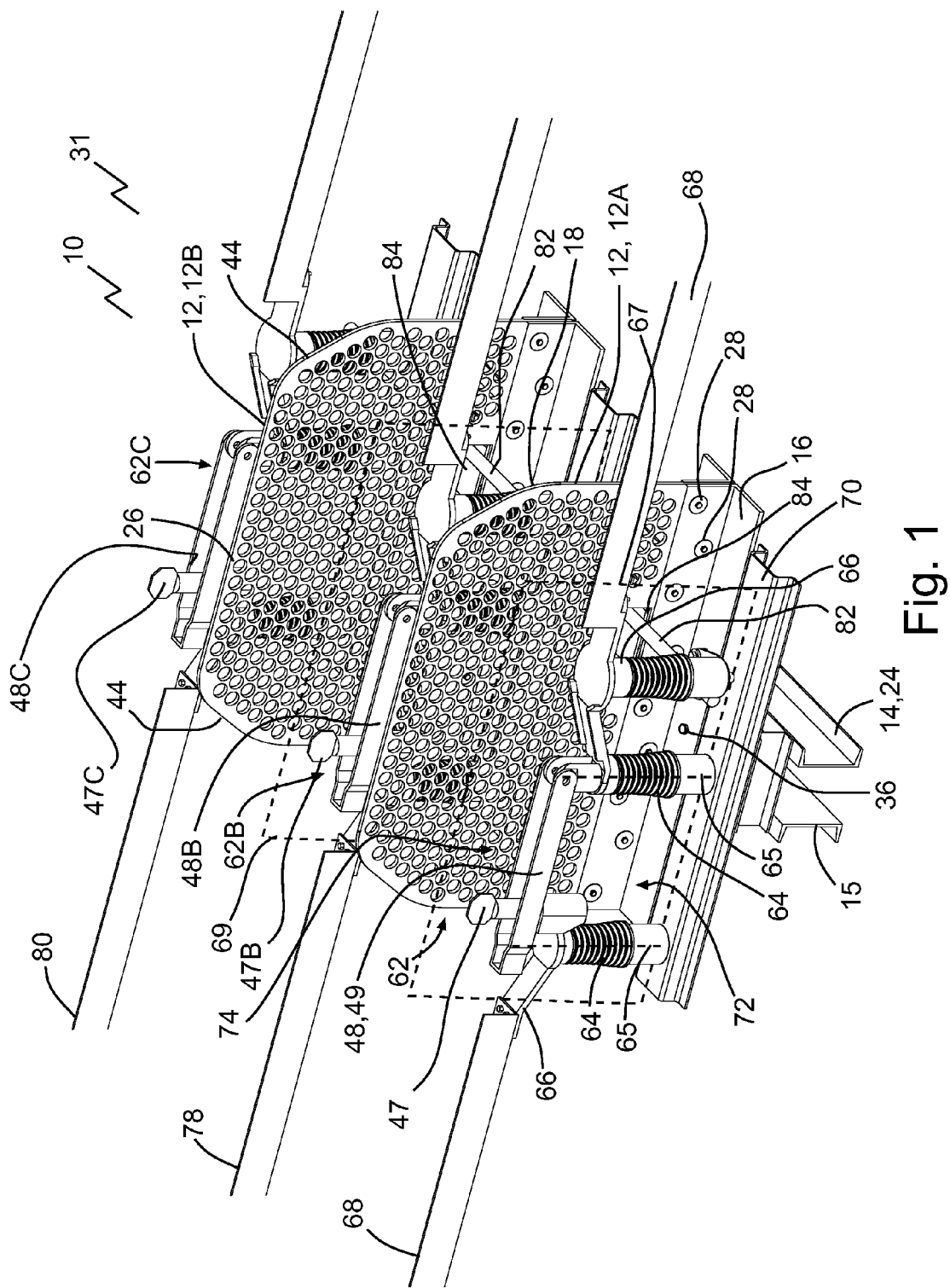

METHOD OF USING BARRIER WALLS IN ELECTRICAL POWER TRANSMISSION SYSTEMS

TECHNICAL FIELD

This document relates to barrier walls and methods of use in electrical power transmission systems.

BACKGROUND

Wildlife disc guards are mounted on switch insulators in electrical power transmission systems. Wildlife discs are also mounted on power poles in some cases. Rotatable sleeves, for example marketed by Critter Guard, Inc. of Missouri as CRITTER LINE GUARD™, are mounted in series on power line cables to deter passage of animals across the cables.

SUMMARY

A method of protecting a switch having exposed conducting components and being mounted on a structural frame that forms part of an electrical power transmission system, the switch having one or more insulators extended from the structural frame, first and second conductor connectors supported on the one or more insulators, and a blade connected to pivot to close and open an electrical path between the first and second conductor connectors, the method comprising mounting a barrier wall adjacent the switch and on the structural frame.

A method of protecting a set of adjacent switches on a structural frame that forms part of an electrical power transmission system, each of the adjacent switches being supported on the structural frame by one or more insulators, the method comprising mounting a barrier between the adjacent switches and on the structural frame.

A method of protecting a set of adjacent conductors on a structural frame in a polyphase electrical power transmission system, each of the adjacent conductors being supported on the structural frame by one or more insulators, each of the adjacent conductors being arranged to receive a respective phase of the polyphase electrical power transmission system, the method comprising mounting a barrier wall on the structural frame and between two of the adjacent conductors.

A method comprising mounting a barrier wall to a structural frame that forms part of an electrical power transmission system, the barrier wall having: a base mounted to the structural frame; and a cantilever barrier extended from one side of the base and directed away from the structural frame.

A barrier wall for use in an electrical power transmission system, the barrier wall comprising: a base; a plurality of rods projected from the base; and in which one or more rods, of the plurality of rods, each have one or more sleeve elements mounted for rotation about the respective rod.

An apparatus comprising: a structural frame forming part of an electrical power transmission system; a switch mounted on the structural frame, the switch having exposed conducting components, the switch being a knife switch and having at least a single contact in a first part of the switch, with a first throw arm that moves in a first switch plane; and a barrier supported by the structural frame adjacent to the first part of the switch and the barrier extending in a barrier plane that is parallel to the first switch plane, the barrier extending in the barrier plane at least as far as exposed conducting components of the switch extend in the first switch plane.

A combination of a barrier and structural frame as disclosed here.

In various embodiments, there may be included any one or more of the following features: The barrier wall is spaced from the switch when mounted. The blade comprises one or more blades. The switch has lateral sides defined as being extended from the structural frame and between the first and second conductor connectors, in which the barrier wall is positioned along one of the lateral sides when mounted. The switch has two or more insulators whose respective axes define a plane extended from the structural frame, in which the barrier wall is mounted parallel to the plane. The blade is connected to pivot in a lever plane, and in which the barrier wall is mounted parallel to the lever plane. The barrier wall has a plurality of wind apertures. The barrier wall is mounted to the structural frame using one or more fasteners. The structural frame comprises one or more beams connected to a switch base, which supports the one or more insulators. The barrier wall comprises a base mounted to the structural frame. The base has a plurality of rods projected from the base. One or more rods, of the plurality of rods, each have one or more sleeve elements mounted for rotation about the respective rod. The barrier wall comprises a cantilever barrier extended from one side of the base. The switch is one of a set of adjacent switches on the structural frame, and in which mounting comprises mounting the barrier wall between the adjacent switches. The set of adjacent switches is part of a polyphase electrical power transmission system, each of the adjacent conductors being arranged to receive a respective phase of the polyphase electrical power transmission system. A gang actuator rod is connected to each switch of the set of adjacent switches, in which the barrier wall comprises a passage for the gang actuator rod. The barrier bisects a space between the adjacent switches. The barrier wall comprises dielectric material. The switch has at least a second part that together with the first part forms at least a double contact switch, with a second throw arm that moves in a second switch plane, the second switch plane being parallel to the first switch plane, the barrier being located between the first part and second part of the switch and extending in the barrier plane at least as far as exposed conducting components of the switch extend in the second switch plane. The barrier is located midway between the first part and the second part of the switch.

These and other aspects of the device and method are set out in the claims, which are incorporated here by reference.

BRIEF DESCRIPTION OF THE FIGURES

Embodiments will now be described with reference to the figures, in which like reference characters denote like elements, by way of example, and in which:

FIG. 1 is a perspective view of a pair of barrier walls positioned between adjacent switches in an electrical power transmission system.

DETAILED DESCRIPTION

Figure 1A:
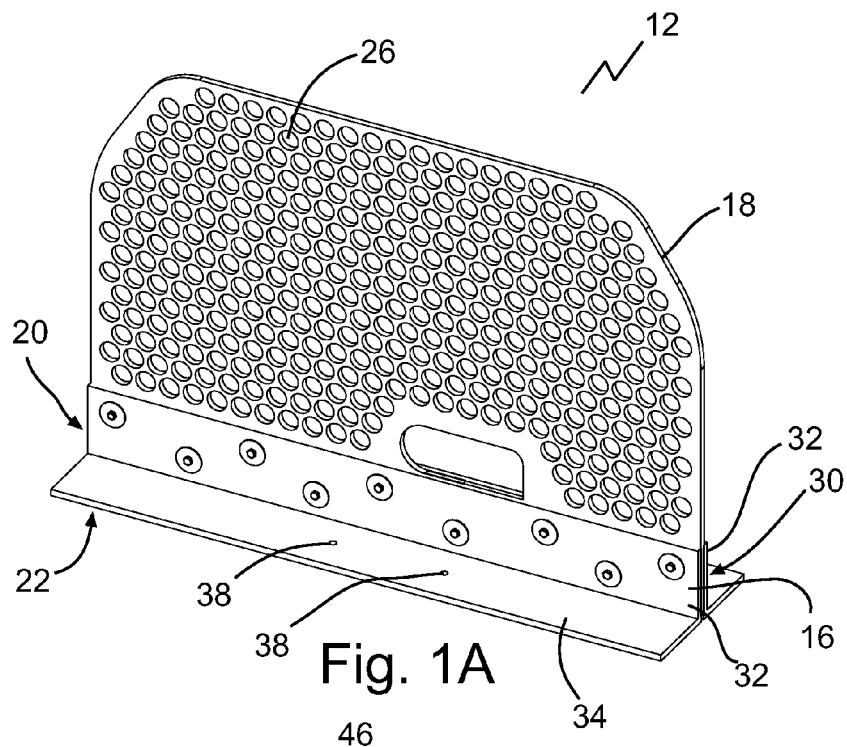
FIG. 1A is a perspective view of the barrier of FIG. 1.

Immaterial modifications may be made to the embodiments described here without departing from what is covered by the claims.

Long-distance electricity transmission is typically carried with high voltage conductors. Transmission at higher voltages reduces resistance power loss, therefore line voltage for long distance lines is stepped up after generation by passing it through transformer stations prior to feeding the power to long-distance transmission lines. Transmission lines traverse large regions and require numerous support towers. The conductors in high tension powerlines are typically uninsulated because of the cost and additional weight of insulated versus uninsulated conductors. Because clearances between adjacent energized elements, and energized and grounded elements, are generally large in long-distance transmission systems, these systems generally are not at risk for animal-caused faults or outages.

Substations transform power from long distance transmission voltages to distribution voltages, typically ranging from 2400 volts to 37,500 volts. Distribution voltages allow for reduced system clearances. These reduced clearances between phase to ground and phase to phase, increase system susceptibility to bird or animal caused outages. Electric poles, towers, and other electrical equipment including substations may provide attractive roosts for birds, particularly in treeless regions. If the wings of a bird simultaneously contact a conductor and another object such as an adjacent conductor, support tower or tree, the resulting electrical short-circuit can kill the bird and also damage the power system. The electrical short circuit can further cause electrical system damage resulting in power outages.

Further, the nesting of birds in open cavities in electrical systems increases the risk that predators will be attracted to the nests and cause a power fault or outage. Predators include mammals such as raccoons and cats, birds such as magpies, and snakes. Predators can also cause electrical short-circuits that can cause electrical faults or outages, damage power systems, and kill the predator. Faults caused by birds and other animals often trigger sensitive relay protection schemes, resulting in substation lockouts, interrupting service to thousands or possibly tens of thousands of customers and at the same time damaging expensive substation equipment.

Thus, some electrical power systems are being insulated from faults caused by contact by birds and other animals. The variety and number of proposed solutions for repelling birds and other animals from electrocution risks highlights the persistence and magnitude of the problems created by such undesirable intrusion. Many different types of scarecrows and other moving devices have been developed to repel birds. In addition to moving devices, various physical structures often involving spikes or other physical barriers, have been developed to discourage birds from roosting on structures. Other bird repelling concepts use electricity or magnetic fields to discourage bird intrusion. Equipment shield and cage devices have been specifically designed to block birds and other animals from accessing and short-circuiting electrical leads, such as described in the inventor's own U.S. Pat. No. 7,834,269.

Referring to FIGS. 1 and 1A, a barrier such as a barrier wall 12 is illustrated. The barrier wall 12 may be mounted on a structural frame 14 that forms part of an electrical power transmission system 10 (FIG. 1). Wall 12 may have a base 16 mounted to the structural frame 14. A cantilever barrier 18 may be extended from one side, for example an upper side 20 as shown opposite a mounting side 22, of the base 16 (FIG. 1A). Cantilever barrier 18 may be directed away from the structural frame 14 when mounted (FIG. 1), for example at least away from a portion 24, of frame 14, that mounts the base 16. Barrier 18 may mount to base 16 by suitable mechanisms, such as by a plurality of fasteners such as bolt and nut combinations 28. Base 16 may form a channel 30 on upper side 20 for receiving barrier 18 (FIG. 1A). Channel 30 may be defined by flanges 32 extending from a base plate 34. The barrier wall 12 may have a plurality of wind apertures, such as mesh or perforations 26, to reduce wear and tear from wind. Other features may be used to increase longevity and strength, for example the use of ridged plastic or fiberglass on wall 12.

Figure 2:
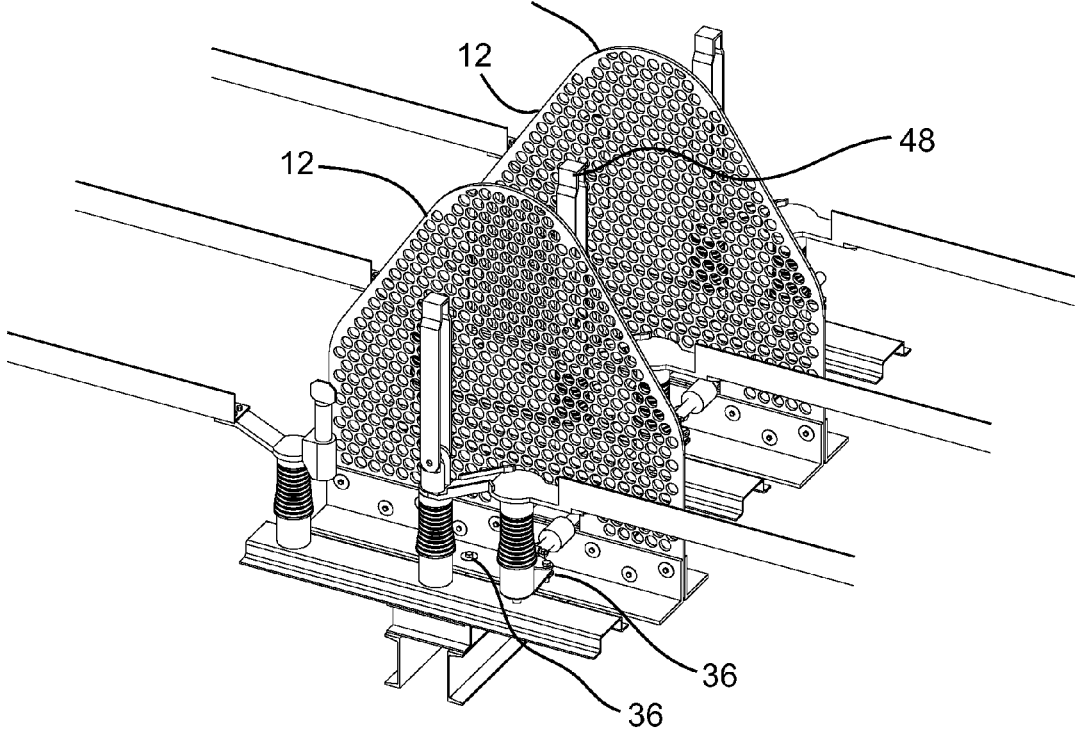
FIG. 2 is a perspective view of a pair of another embodiment of barriers positioned between adjacent switches in an electrical power transmission system.
Figure 2A:
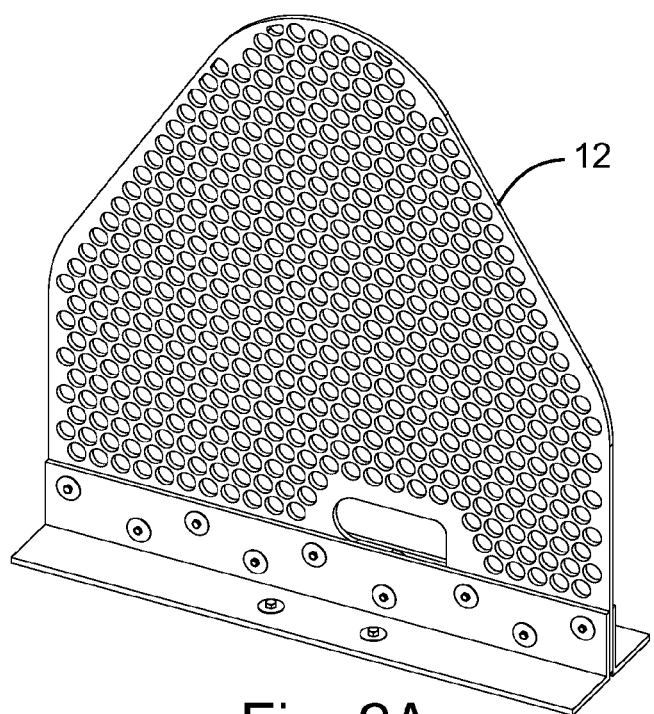
FIG. 2A is a perspective view of the barrier wall of FIG. 2.
Figure 3:
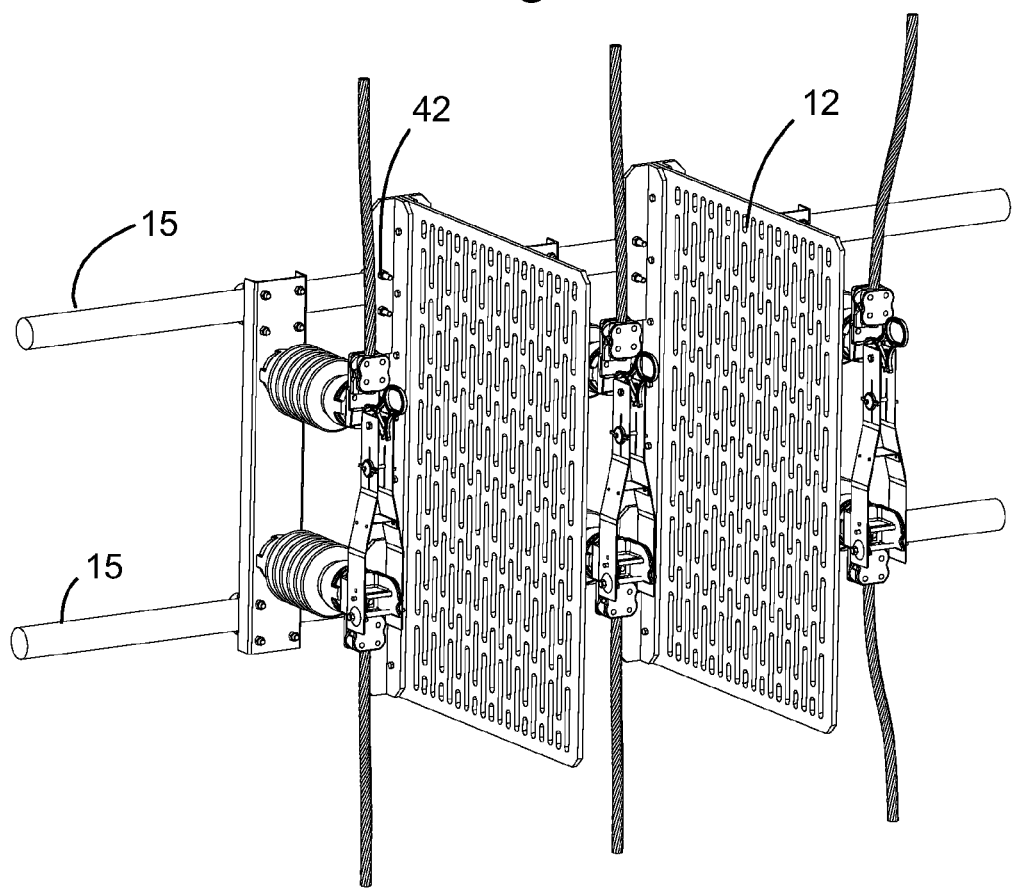
FIG. 3 is a perspective view of a pair of another embodiment of barriers positioned between adjacent switches in an electrical power transmission system.
Figure 3A:
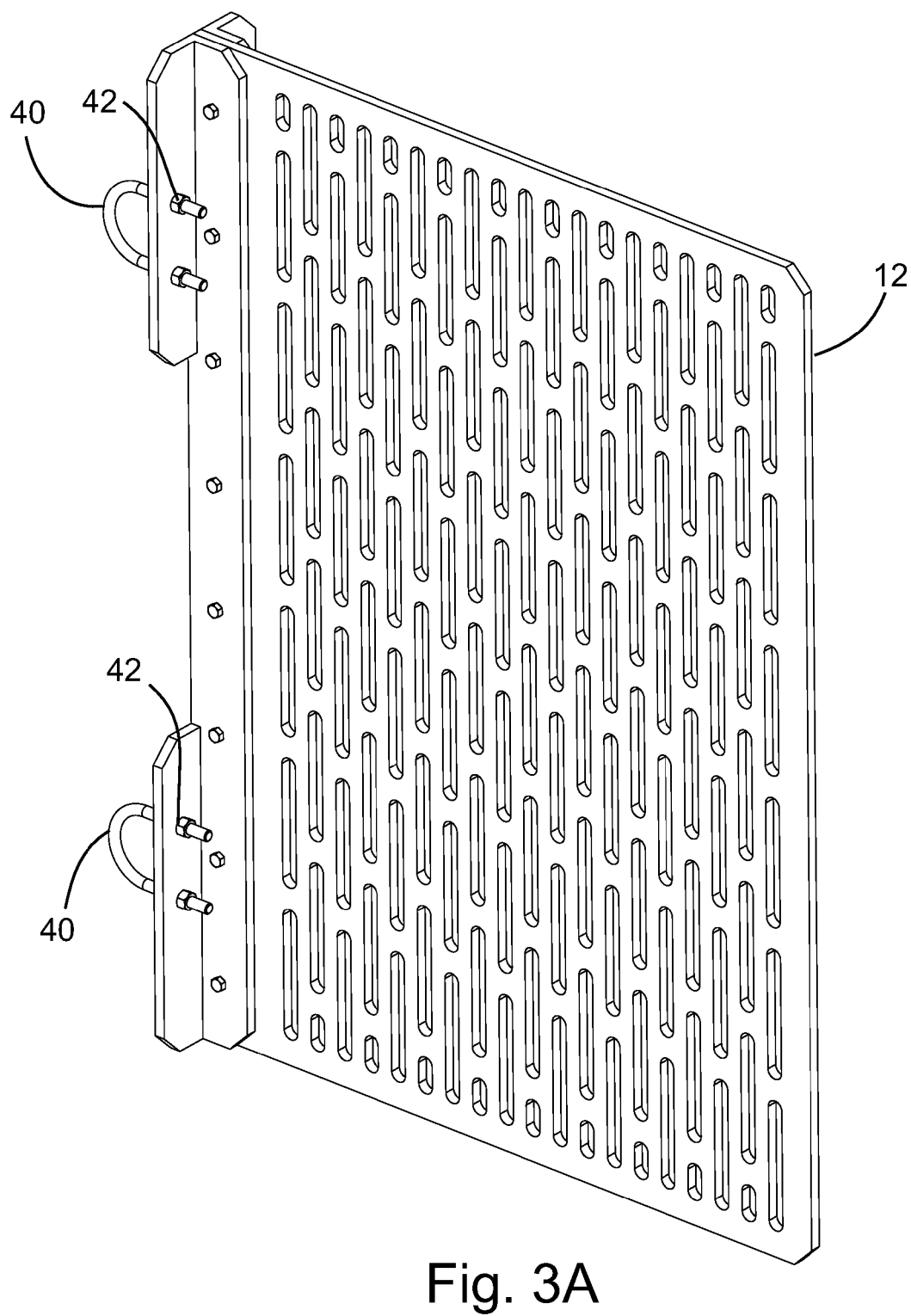
FIG. 3A is a perspective view of the barrier wall of FIG. 3.
Figure 4:
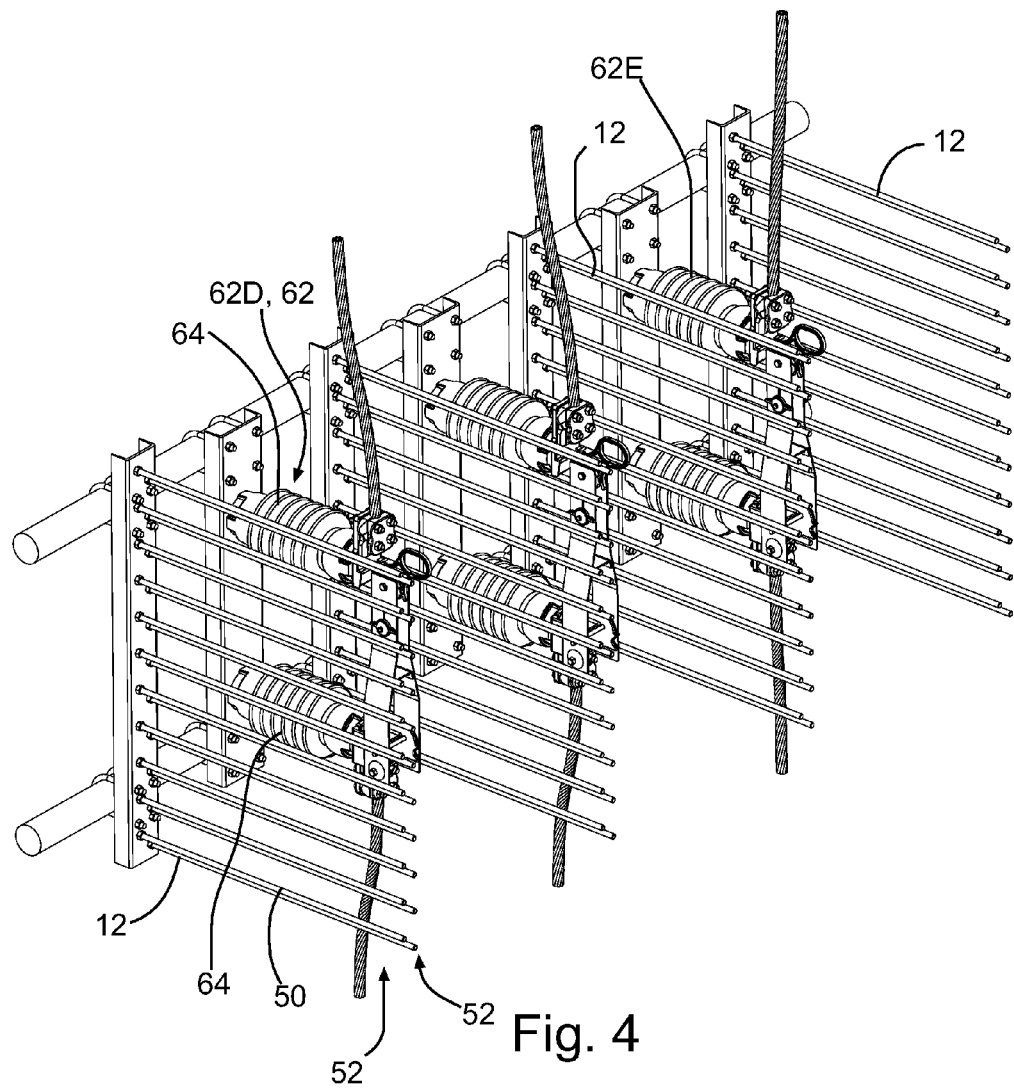
FIG. 4 is a perspective view of a further embodiment of a barrier made with projected rods.
Figure 5:
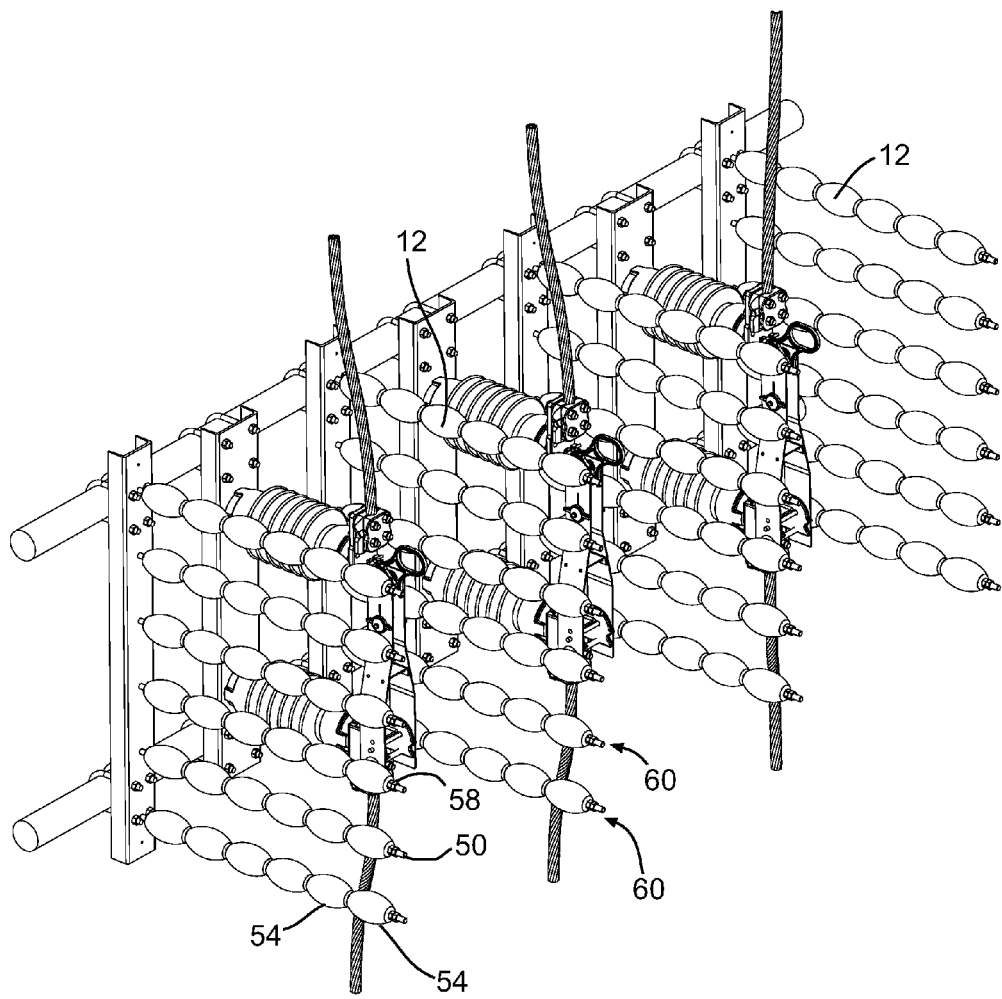
FIG. 5 is a perspective view of a further embodiment of a barrier made with projected rods and rotatable sleeves.

The barrier wall 12 may be mounted to the structural frame 14 using one or more fasteners, such as a nut and bolt combination 36 (FIG. 1) passed through one or more respective holes 38 (FIG. 1A) in base 16. Referring to FIG. 2, the barrier wall 12 is also shown mounted with nut and bolt combinations 36. Referring to FIGS. 3 and 3A, fasteners such as U-bolts 40 may be used and secured with nuts 42, with U-bolts 40 each wrapping around a beam 15 of structural frame 14 (FIG. 3). Referring to FIGS. 4 and 5, U-bolts 40 are also used. Other suitable fasteners such as rivets, bonds, threaded fasteners, nails, push fasteners, adhesive, straps, crimps, tape, stitches, staples, and rod and split pin combinations may be used to secure base 16 to frame 14, and in general any two components disclosed here, together. Bonds include welds, soldering, and brazing. Adhesive includes cementing and gluing. Threaded fasteners include screws, bolts and nuts. Push fasteners include friction plugs such as Christmas tree fasteners. Rod and split pin combinations include cotter pins, and bowtie pins. Straps include tie wraps, bands, and wires.

Barrier wall 12 may take a variety of suitable forms. For example, cantilever barrier 18 may have a plate shape as shown, or may have other suitable shapes, including shapes that are other than the planar appearance shown in FIG. 1. Barriers 18 may have beveled corners 44 (FIG. 1), a peak 46 extended and aligned to block lateral access to a switch blade 48 when in the open position (FIG. 2), or may have a rectangular shape (FIG. 3). Other shapes may be used.

Referring to FIGS. 4 and 5, two other example styles of barrier wall 12 are illustrated. For example, barrier 18 may include a plurality of rods 50 projected from the base 16 (FIG. 4). One or more rows 52 of rods 50 may project from base 16, rods 50 collectively defining barrier 18. Spacing between adjacent rods 50 may be minimized or eliminated to deter passage of small animals, including squirrels and mice. One or more rods 50 may each have one or more sleeve elements 54 mounted for rotation about the respective rod 50 (FIG. 5). Sleeve elements 54 may further deter animal traffic by providing an unstable surface for the animal to grip, climb, or traverse. Nuts 58 or other suitable mechanisms may be used to secure elements 54 on each rod 50. Sleeve elements 54 may be hollow and cylindrical, like a pontoon on a string. Terminal ends 60 of adjacent rods 50 may be connected together via a beam or other element (not shown).

Referring to FIG. 4, barrier wall 12 may be mounted on the structural frame 14 and adjacent a conductor, such as a switch 62, which is also mounted on the structural frame 14. Switch 62 may be exposed as shown, with exposed conducting components such as an electrical contact 47 and blade 48, as is common with disconnect switches in electrical power transmission systems 10. A switch 62 is used to selectively connect and disconnect a circuit in an electrical power transmission system 10. Contact 47 may form part of a terminal, which is referred to by various names such as a pole, jaw, or arc-horn. Contact 47 acts as a blade receiver. Referring to FIG. 1, the switch 62 may have one or more insulators 64 extended from the structural frame 14. Insulators 64 space the electrically active components of switch 62 from one another and from structural frame 14 to avoid phase to ground faults or arcs when the circuit is closed. Switch 62 may have first and second conductor connectors, such as terminals 66, connected to transmission conductors 68, which include one or more buses as shown, supported on the one or more insulators 64. Buses may have a rigid, wire or other suitable profile, and include pipes, angles, square tubes, flat bars, and other suitable styles used for current transfer. A blade 48, which includes a lever arm, may have one or more throw arms 49 of a blade switch 62, may be connected to pivot to close and open an electrical path between the terminals 66. Insulators 64 may be supported by a switch base 70, which itself mounts the switch 62 to beam 15 of frame 14 in the example shown.

The switch 62 may have lateral sides 72 and 74 defined as being extended from the structural frame 14 and between the first and second conductor connectors 66. The barrier wall 12 may be positioned along one of the lateral sides, in this case side 74 for wall 12A, when mounted. The switch 62 may have two or more insulators 64 whose respective axes 65 define a plane 67 extended from the structural frame 14. The barrier wall 12A may be mounted parallel to the plane 67 as shown. Plane 67 may also be defined by the blade 48 in some cases, for example if the blade 48 is connected to pivot in a plane 67. The plane that the blade 48 pivots in need not be the same as the plane that is defined by insulator axes 65. Plane 67 may also be defined as a first plane through which arm 48 moves to complete the circuit by touching contact 47. The barrier 12A may extend in a barrier plane defined by cantilever barrier 18 in the FIG. 1 as shown, the barrier plane being parallel to the first switch plane 67. The barrier may extend in the barrier plane at least as far as exposed conducting components of the switch 62 extend in the first switch plane 67. The barrier may extend as far as exposed conducting components extend even when in the open position (FIG. 2).

The conductor, such as switch 62, may be one of a set 31 of adjacent conductors, such as switches as shown, on the structural frame 14 (FIG. 1). The barrier wall 12 may be mounted between the adjacent switches, for example wall 12A between switches 62A and 62B, and wall 12B between switches 62B and 62C. Walls 12A and 12B may be spaced from the switches 62 as shown. The spacing may be greater than the minimum electrical air clearance from the energized switch 62 to prevent arcing from the switch 62 through the barrier 12. 12A may bisect the space between switches 62A and 62B.

The adjacent conductors, such as switches 62, may form part of a polyphase electrical power transmission system 10, with each of the adjacent switches 62 being arranged to receive a respective phase of the polyphase system. The example shown illustrates a three phase system, with each of conductors 68, 78, and 80 carrying alternating currents of different phases. Walls 12 thus act as a barrier to animals and other wildlife from getting close enough to two switches 62 at a time to cause phase to phase faults.

Adjacent switches 62 may have a gang actuator rod or rods 82 connected to each switch 62 of the set of adjacent switches. The barrier walls 12 may each comprise a passage 84 positioned to receive and pass the gang actuator rod 82. Gang rods 82 or other ganged switchgear systems permit all phase switches 62 to be opened or closed simultaneously.

The set 31 of switches 62 may be considered a single multi-pole switch in cases where the individual switches of the set are ganged together. Thus, for example switch 62A may be considered a first part of the switch 31, switch 62B may be considered a second part of the switch 31, and in some cases switch 62C a third part of the switch 31. Each part of the switch 31 may have a respective contact 47 and throw arm 48 combination. A second switch plane 69 may be parallel to the first switch plane 67, and the barrier 12A may be located, for example midway, between the first part and second part of the switch 31. The barrier 12A may extend in the barrier plane defined by cantilever barrier 18 at least as far as exposed conducting components of the switch 31 extend in the second switch plane 69.

Referring to FIG. 4, walls 12 may be mounted adjacent to the outermost switches 62D and 62E as shown. Such a configuration blocks animal access to such switches, thus reducing the risk of phase to ground faults, for example between switch 62D and structural frame 14.

As shown, walls 12 may be mounted in a variety or orientations, including upright (FIGS. 1 and 2) and sideways (FIGS. 3, 4, 5). Walls 12 may also be oriented horizontally, for example if used to block vertical access to a switch, for example mounted on a vertical beam. Other intermediate orientations may be used.

Figure 6:
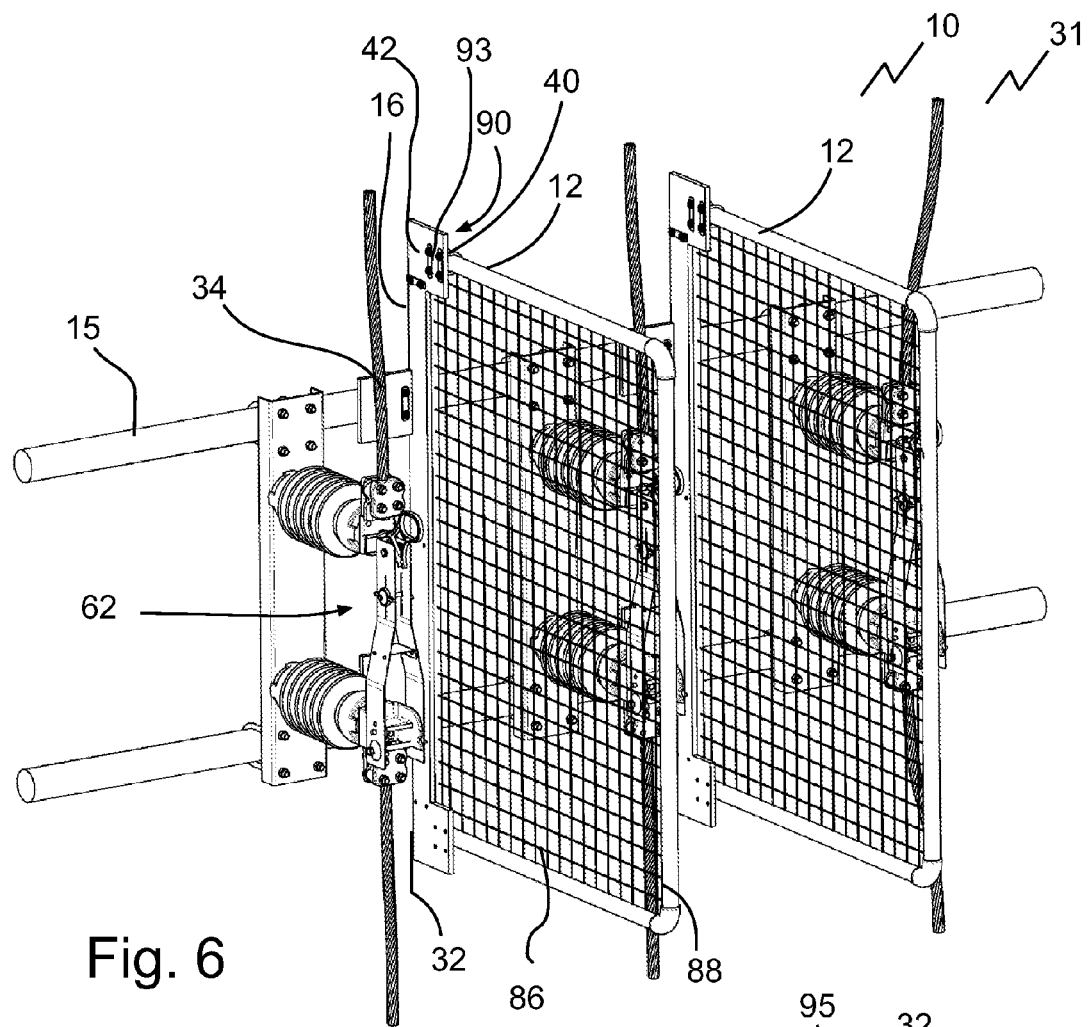
FIG. 6 is a perspective view of a pair of an embodiment of mesh barriers positioned between adjacent switches in an electrical power transmission system.
Figure 7:
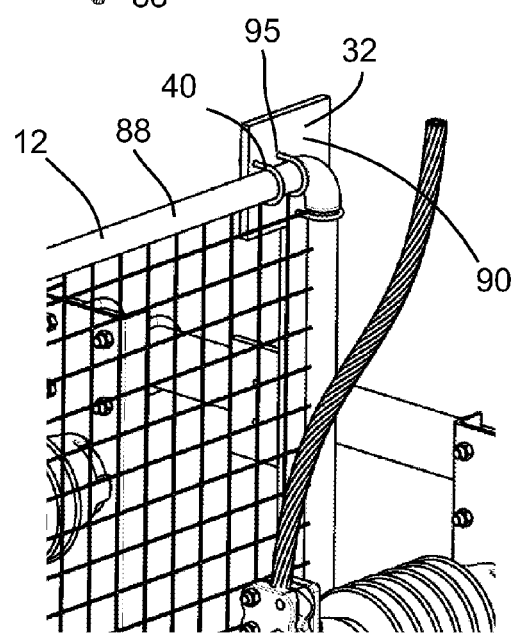
FIG. 7 is a partial perspective view of one of the mesh barriers of FIG. 6 viewed from the opposite side shown in FIG. 6.

Referring to FIG. 6, a further embodiment of a barrier wall 12 is illustrated, with each wall 12 including a plastic mesh 86 for example supported by a frame such as a peripheral frame 88. Frame 88 may mount to base 16 for example by mounting to one side 90 of a flange 32 extending from a base plate 34. Referring to FIGS. 6 and 7, frame 88 mounts to side 90 of flange 32 via a loop fastener such as U-bolt 40 passed through slot 93 in flange 32, with U-bolt 40 being secured with backings such as nuts 42. Referring to FIG. 6 the same style of fastening, namely with U-bolts 40 and holes 95 is used to secure base plate 34 to beam 15. Washers (not shown) may be used along with nuts 42. A mesh 86 provides relatively less wind loading and requires reduced structural support than does a solid panel with apertures 26 as shown in FIG. 1. Mesh 86 may be made of suitable non-conductive material, including plastic, fabric, or fibreglass.

Although conductors such as switches 62 are shown, the methods and apparatuses may be used on other conductors, for example fuse cutout devices. Parallel does not mean exactly parallel, and deviations are permitted, for example so long as a face of wall 12 is directed towards plane 67. Methods include mounting the barrier wall 12 on structural frame 14. As shown in FIG. 1, in some cases there may be no underlying horizontal surface below at least a portion of barrier wall 12.

The barrier wall 12 may be made at least in part with dielectric material. Electrical power transmission system may refer to any apparatus intended to transmit power and includes distribution systems and substations. It will be understood that the teachings equally apply and may be adapted to any commercially used voltage range or any suitable transmission system.

In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

The embodiments of the invention in which an exclusive property or privilege is claimed are defined as follows:

1. A method of protecting a switch having exposed conducting components, the method comprising:
   mounting a barrier wall adjacent a switch and on a beam of a structural frame, which forms part of an electrical power transmission system;
   in which the switch is mounted on the structural frame, with the beam extending away from the switch, the switch having:
      one or more insulators extended from the structural frame;
      first and second conductor connectors supported on the one or more insulators; and
      a blade connected to pivot to close and open an electrical path between the first and second conductor connectors;
   in which a face of the barrier wall is directed toward the switch to block animals from moving past the barrier wall toward the switch; and
   in which a maximum length and maximum width of the face are defined perpendicular to one another along the face, with the maximum length and maximum width being greater than a maximum thickness of the barrier wall, the maximum thickness being defined perpendicular to the face.

2. The method of claim 1 in which the barrier wall is spaced from the switch when mounted.

3. The method of claim 1 in which the barrier wall has a plurality of wind apertures.

4. The method of claim 1 in which the barrier wall is mounted to the structural frame using one or more fasteners.

5. The method of claim 1 in which the barrier wall comprises a base mounted to the structural frame.

6. The method of claim 5 in which the barrier wall comprises a cantilever barrier extended from one side of the base.

7. The method of claim 5 in which the barrier wall comprises a plurality of rods projected from the base to collectively define the face of the barrier wall.

8. The method of claim 1 in which the barrier wall comprises dielectric material.

\* \* \* \* \*